(12) United States Patent
Gouldsworthy

(10) Patent No.: US 7,077,000 B2
(45) Date of Patent: Jul. 18, 2006

(54) VOLUME MEASUREMENT OF LIQUIDS

(76) Inventor: Beth Gouldsworthy, 42 Bathurst Close, Burnham-on-sea, Somerset TA8 2SZ (GB)

( * ) Notice: Subject to any disclaimer, the term of this patent is extended or adjusted under 35 U.S.C. 154(b) by 0 days.

(21) Appl. No.: 10/504,344

(22) PCT Filed: Feb. 13, 2003

(86) PCT No.: PCT/GB03/00632
§ 371 (c)(1),
(2), (4) Date: Aug. 12, 2004

(87) PCT Pub. No.: WO03/068126
PCT Pub. Date: Aug. 21, 2003

(65) Prior Publication Data
US 2005/0066432 A1    Mar. 31, 2005

(30) Foreign Application Priority Data
Feb. 13, 2002    (GB) ................................ 0203389.2

(51) Int. Cl.
*G01F 19/00*    (2006.01)

(52) U.S. Cl. ........................................................ 73/149
(58) Field of Classification Search .................. 73/323, 73/149; 4/458
See application file for complete search history.

(56) References Cited

U.S. PATENT DOCUMENTS

| | | | | |
|---|---|---|---|---|
| 3,251,148 A | * | 5/1966 | Knapp | ......................... 38/77.2 |
| 5,238,749 A | * | 8/1993 | Cueman et al. | ............. 428/441 |
| 2003/0140409 A1 | * | 7/2003 | Johnson | ......................... 4/458 |

* cited by examiner

*Primary Examiner*—Hezron Williams
*Assistant Examiner*—Paul M. West
(74) *Attorney, Agent, or Firm*—Notaro & Michalos PC

(57) ABSTRACT

A bedpan comprises a body (1) formed to provide a first chamber (2) for receiving liquid and a second chamber (5) provided with a scale (11) for measuring the volume of the liquid received in the first chamber. Liquid received in the first chamber (2) can be transferred to the second chamber (5) by tilting the bedpan, and this second chamber is arranged to create a deeper body of liquid so that relatively small variations in the volume of liquid result in relatively large variations in the level of liquid in the second chamber which can be measured more accurately.

8 Claims, 2 Drawing Sheets

VOLUME MEASUREMENT OF LIQUIDS

Figure 1:
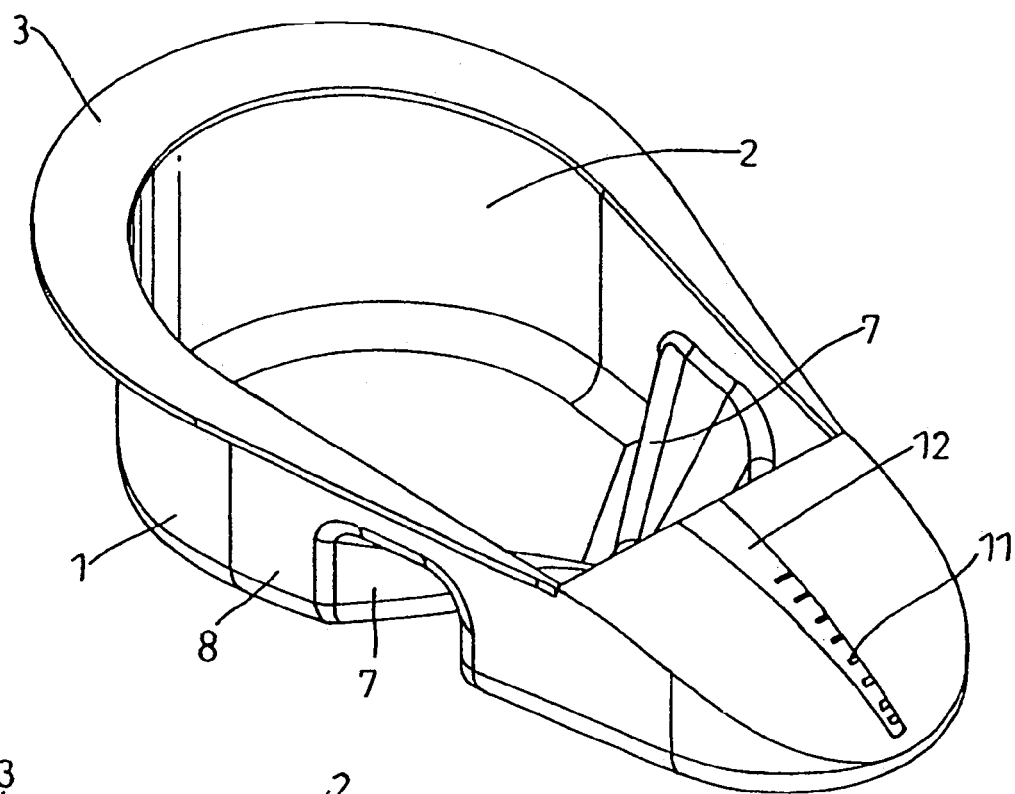

This invention is concerned with the measurement of the volume of liquids contained in receptacles.

A commonly used method of facilitating such measurement is to provide a receptacle with a scale comprising a series of marks usually representing litres or millilitres, or gallons or pints, arranged so that in use the mark reached by the level of liquid in the receptacle represents the volume of liquid in the receptacle.

However, there are instances where the shape or/and size of the receptacle makes this method not feasible because for the different amounts of liquid which the receptacle is designed to hold, the variation in the depth of the liquid is not sufficient to enable a scale to be provided with marks which are spaced apart enough to enable an accurate reading to be taken.

An example of such a receptacle is a bedpan, and in fact it is in relation to bedpans that the present invention has been devised. The invention will therefore be described with particular reference to bedpans although it is to be understood that there is no limitation in this regard as the invention is applicable to receptacles for other uses.

It is sometimes necessary for medical reasons to measure the volume of urine excreted by a person into a bedpan. Such measurement often has to be very accurate but the volume scales conventionally provided on bedpans, as disclosed for example in U.S. Pat. No. 5,819,334, are incapable of providing the required degree of accuracy.

The object of the present invention is to provide a receptacle for liquids with means capable of facilitating accurate measurement of the volume of liquid in the receptacle. A particular aim is to overcome the above problem in connection with bedpans.

According to the invention a receptacle for liquids comprises a first chamber for receiving liquid and a second chamber for measuring the volume of liquid received in said first chamber, the two chambers being in communication or adapted to be brought into communication with one another and being arranged so that, in use, the liquid received in the first chamber can flow, or be caused to flow into said second chamber to create a deeper body of liquid.

The idea is that by providing a separate chamber to facilitate measurement of the volume of liquid introduced into the first chamber, a greater degree of control than has previously been possible with the conventional arrangements referred to above can be exercised over such measurement, in particular as regards the accuracy of the measurement. This is achieved by creating a deeper body of liquid in the second chamber compared with the depth of the liquid received in the first chamber so that relatively small variations in the volume of liquid flowing into the second chamber from the first chamber result in relatively large variations in the level of the liquid in the second chamber. Such large variations make it possible to measure the volume of liquid more accurately.

The second chamber is conveniently provided with a scale. Preferably this scale is relatively coarsely graduated so that the marks of the scale represent relatively small variations in the volume of liquid in the second chamber, thereby facilitating very accurate measurement of this volume.

Preferably both chambers are formed within a rigid body. The first chamber preferably has a shallow liquid-containing part and the second chamber has a relatively deeper liquid-containing part. The second chamber may be of constant cross section in its depthwise direction so that the marks of the scale. representing regular changes in volume can be regularly spaced from one another.

Preferably the second chamber is arranged so that liquid does not normally enter it as liquid is introduced into the first chamber, and liquid can be caused to flow from the first chamber into the second chamber for measurement purposes by tilting the receptacle. This may be achieved by providing a constricted passage between the two chambers. For some uses the chamber may be provided with means for controlling the flow of liquid into the chamber, for example a valve.

Preferably the receptacle is a bedpan.

The receptacle or bedpan can be made of any appropriate material which, particularly in the case of a bedpan, may be such that the bedpan is disposable or re-usable.

Figure 3:
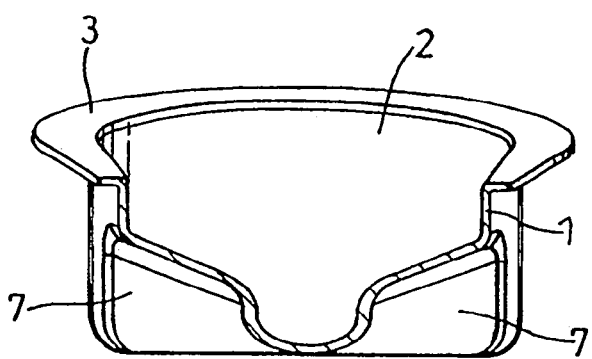
Figure 5:
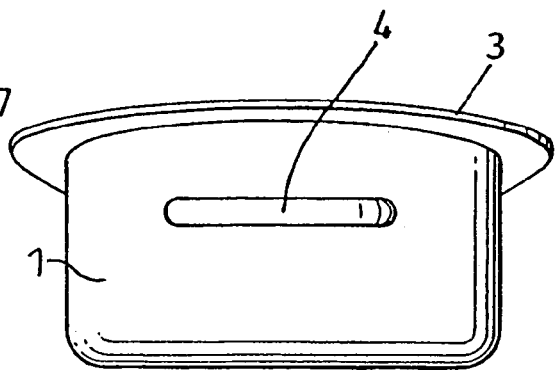
Figure 4:
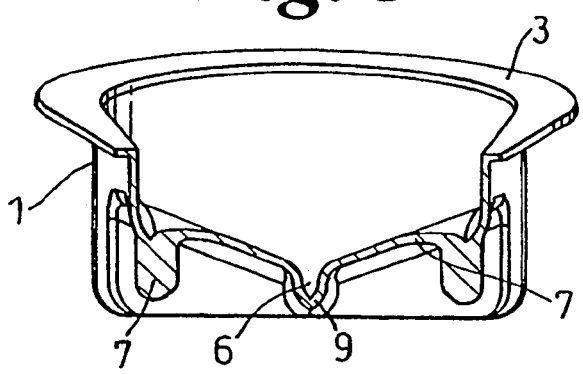
Figure 2:
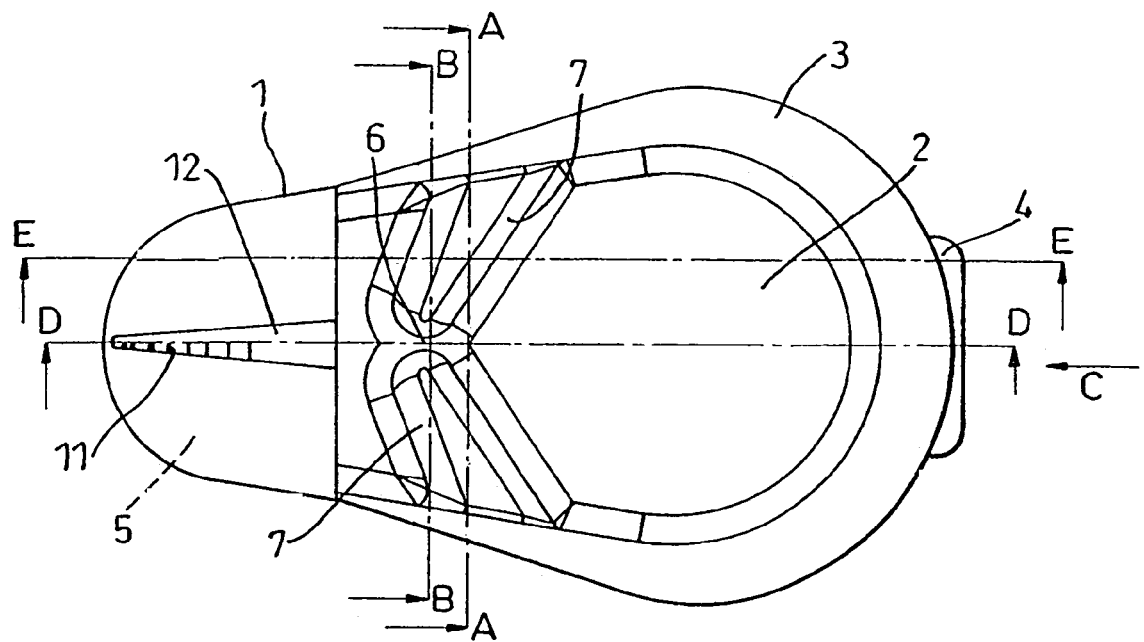
Figure 6:
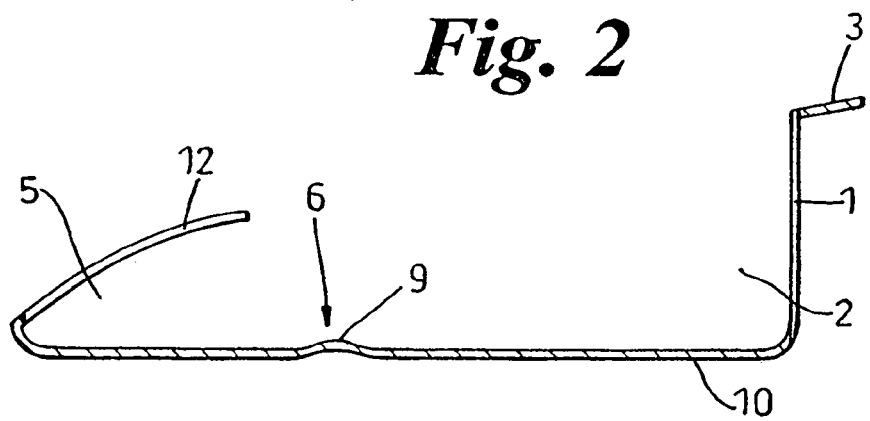
Figure 7:
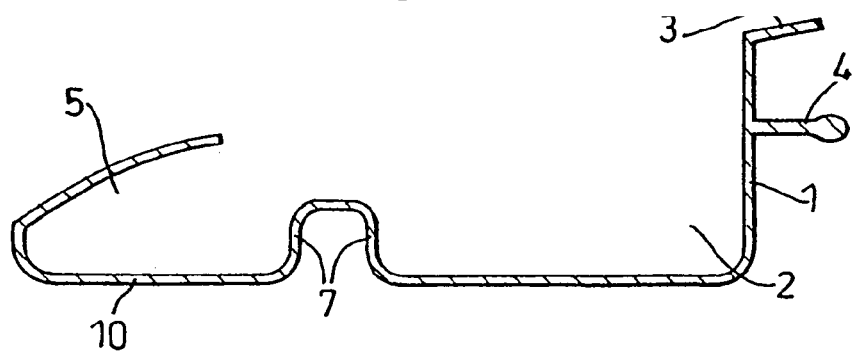

The invention will now be described by way of example with reference to the accompanying drawings, in which:

FIG. 1 is a perspective view of a preferred form of bedpan embodying the invention, FIG. 2 is a plan view of the bedpan, FIG. 3 is a cross-sectional view taken on the line A—A in FIG. 2, FIG. 4 is a cross sectional view taken on the line B—B in FIG. 2, FIG. 5 is an end view taken in the direction of arrow C in FIG. 2, FIG. 6 is a cross sectional view taken on the line D—D in FIG. 2, and FIG. 7 is a cross sectional view taken on the line E—E in FIG. 2.

The bedpan illustrated in the drawings comprises a rigid body 1 formed to provide a first chamber 2 which is open at the top where it is provided with a surrounding lip 3 shaped to provide a support for the anatomy of a person sitting on the bedpan. The bedpan has a handle 4.

The first chamber 1 communicates with a second, volume measuring chamber 5 formed in the body 1 at the front end of the first chamber 2. Such communication is via a constricted passage 6 which is formed so that urine excreted into the first chamber 2 does not normally flow into the second chamber 5. The passage 6 is formed between the inner ends of two generally triangular shaped walls 7 extending inwardly towards one another from cut-away portions of the respective side walls 8 of the body 1, and the constriction in the passage is formed by raising the bottom 9 of the passage between the inner ends of the walls 7 above the flat base 10 of the body.

When it is required to measure the volume of urine excreted by a person into the bedpan (which typically is of the order of 20–800 millilitres), the bedpan is tilted into a vertical position so that all the urine flows from the first chamber 2 into the second chamber 5. Associated with this chamber is a scale 11 calibrated in millilitres and arranged so that with the bedpan in a vertical position the mark reached by the level of the liquid in the chamber indicates the volume of the liquid. The marks of the scale are relatively coarsely graduated and are provided on a transparent portion 12 through which the level of the urine in the chamber 5 can be viewed.

Although the amount of urine excreted into the first chamber 2 has little depth because of its large surface area, by causing the urine to flow into the second chamber 5 which is relatively deep compared with its width, a body of liquid of a greater depth is created thereby enabling the volume to be measured very accurately.

The bedpan may be made of a plastics material so that it is re-usable, or a disposable paper-based or pulp material.

The material may be coated with an anti-bacterial agent.

An advantage of the bedpan according to the invention is that it enables the volume of excreted urine to be measured accurately in a non-invasive manner compared with other methods of measurement involving the use of catheters.

It is to be understood that the present invention is not limited to the example shown in the drawings, nor to any particular uses of receptacles embodying the invention. The invention includes any novel and inventive feature disclosed herein either alone or in combination with any one or more other such features.

The invention claimed is:

1. A bedpan for bodily fluid which comprises a receptacle having a first chamber for receiving bodily fluid and a second chamber for measuring the volume of bodily fluid received in said first chamber, the two chambers being in communication or adapted to be brought into communication with one another by means of constricted passage between the two chambers, said chambers being arranged so that, in use, the bodily fluid received in the first chamber can flow, or be caused to flow into said second chamber to create a deeper body of fluid, and in which both chambers are formed within a rigid body.

2. A bedpan as claimed in claim 1, in which the second chamber is provided with a scale.

3. A bedpan as claimed in claim 2, in which the scale is relatively coarsely graduated so that the marks of the scale represent relatively small variations in the volume of fluid in the first chamber.

4. A bedpan as claimed in claim 2, in which the second chamber has a cross-sectional form in its depth-wise direction so the marks of the scare representing regular changes in volume can be regularly spaced from one another.

5. A bedpan as claimed in claim 1, in which the first chamber has a shallow fluid-containing part and second chamber has a relatively deeper fluid-containing part.

6. A bedpan as claimed in claim 1, in which the second chamber is arranged so that fluid does not normally enter the second chamber as fluid is introduced into the first chamber, and fluid can be caused to flow from the first chamber into the second chamber for measurement purposes by tilting the bedpan.

7. A bedpan according to claim 1, wherein the bedpan is coated with an anti-bacterial agent.

8. A bedpan for bodily fluid which comprises a receptacle having a first chamber for receiving bodily fluid and a second chamber for measuring the volume of bodily fluid received in said first chamber, the two chambers being in communication or adapted to be brought into communication with one another by means of constricted passage between the two chambers, said chambers being arranged so that, in use, the bodily fluid received in the first chamber can flow, or be caused to flow into said second chamber to create a deeper body of fluid, and in which the second chamber is arranged so that fluid does not normally enter the second chamber as fluid is introduced into the first chamber, and fluid can be caused to flow from the first chamber into the second chamber for measurement purposes by tilting the bedpan.

* * * * *